April 24, 1945. W. J. MILLER 2,374,553
METHOD AND APPARATUS FOR FEEDING CLAY TO MOLDS
Filed Dec. 2, 1941 7 Sheets-Sheet 4
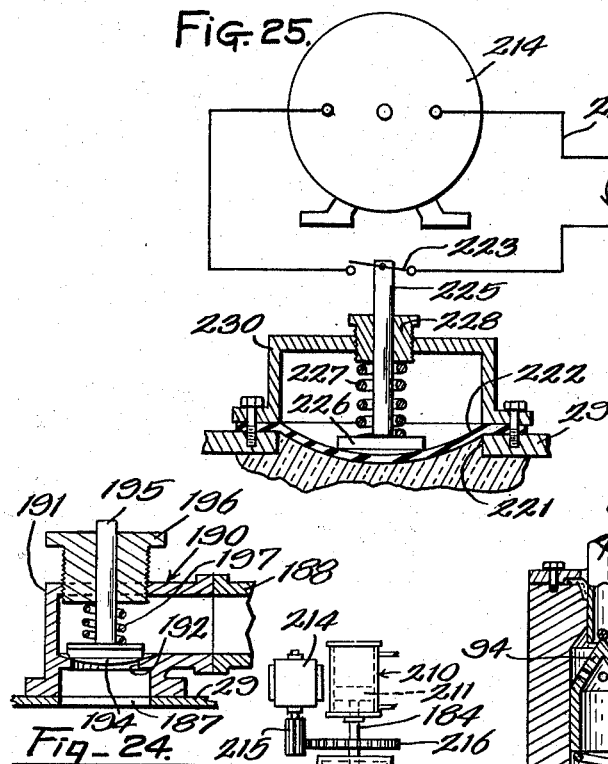
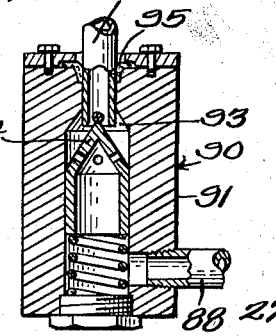
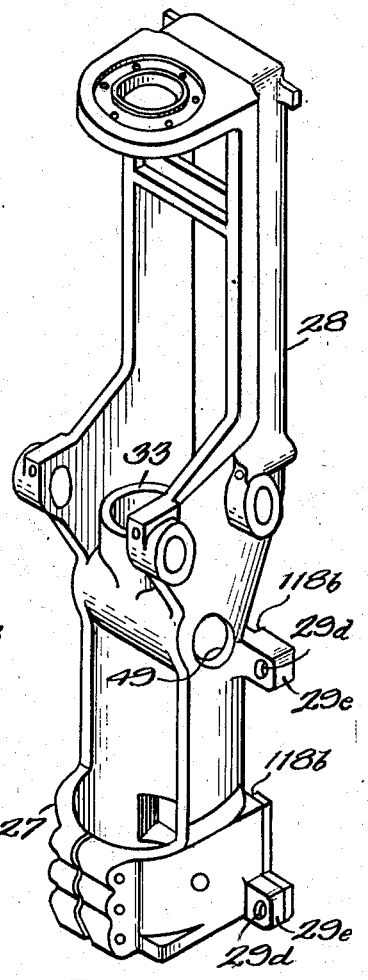
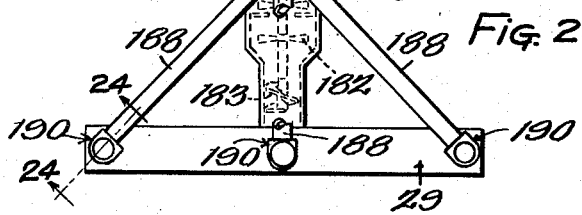
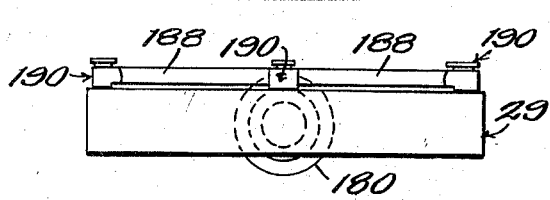
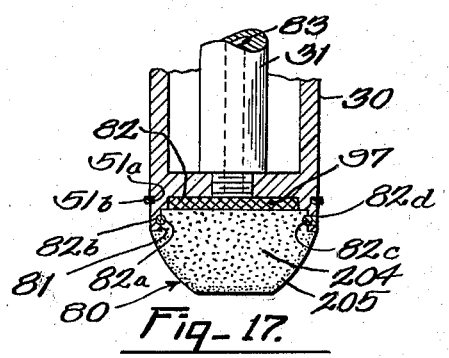
INVENTOR.
WILLIAM J. MILLER
BY
ATTORNEY.

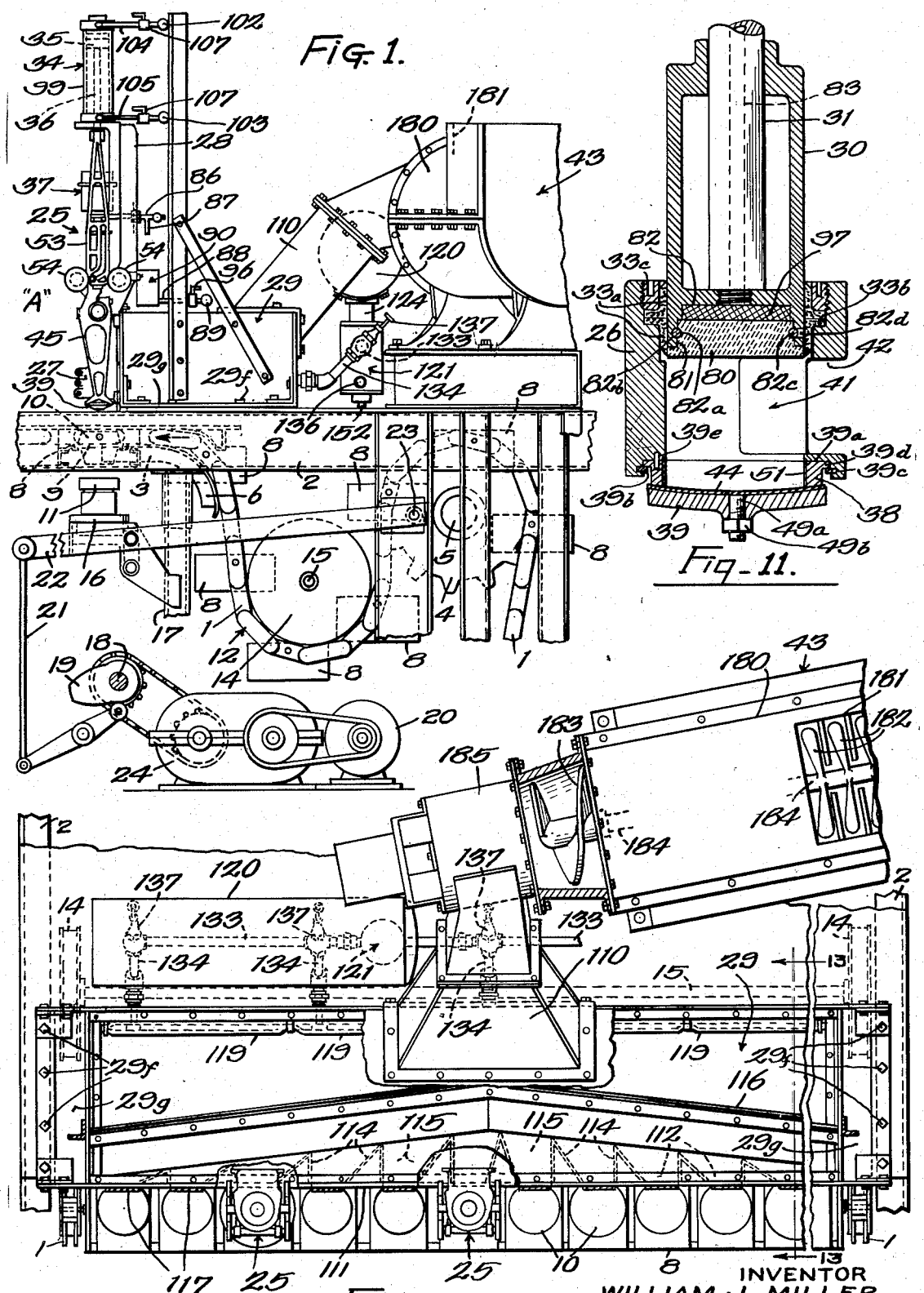

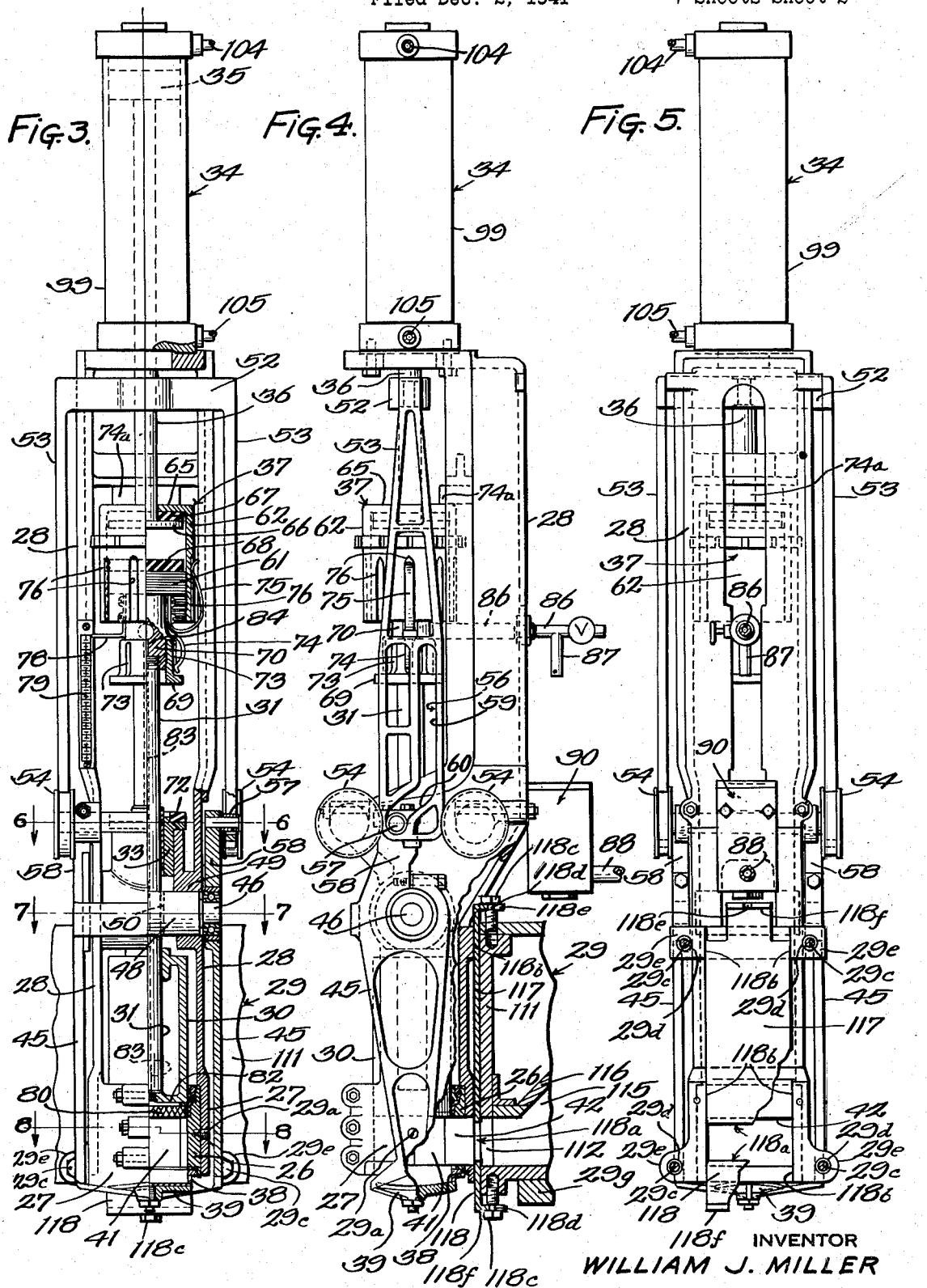

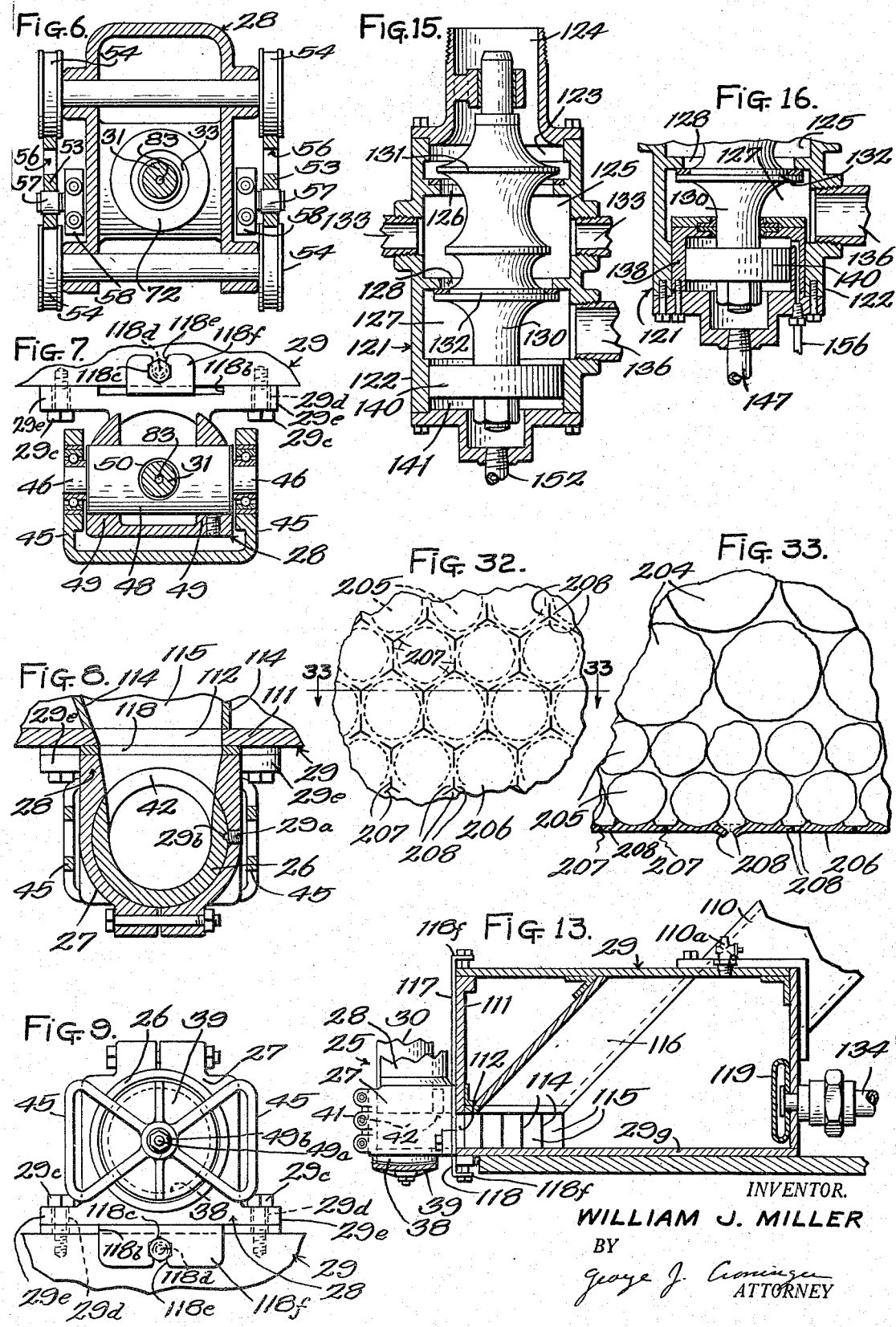

April 24, 1945. W. J. MILLER 2,374,553
METHOD AND APPARATUS FOR FEEDING CLAY TO MOLDS
Filed Dec. 2, 1941 7 Sheets-Sheet 5
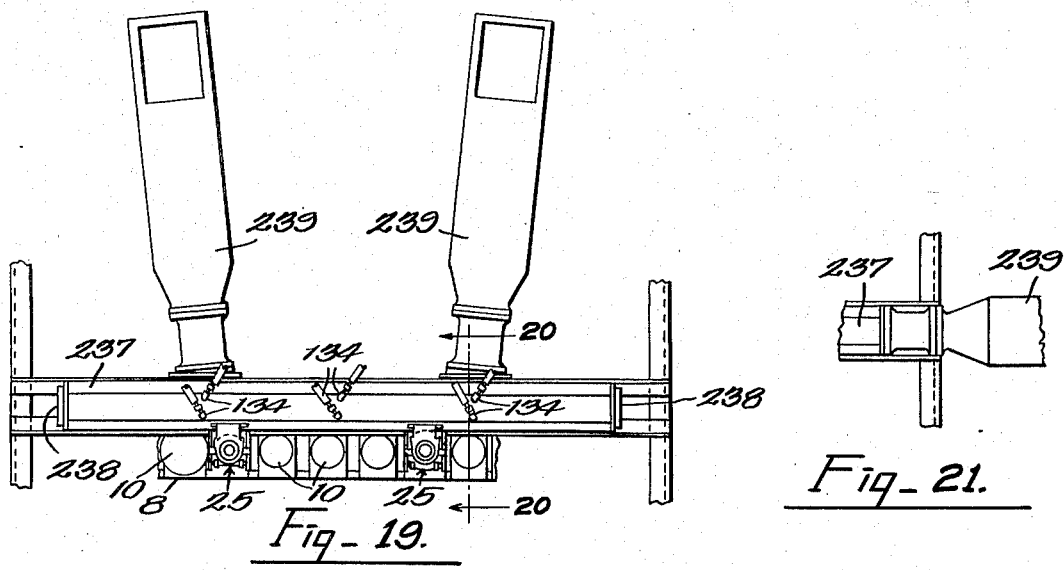
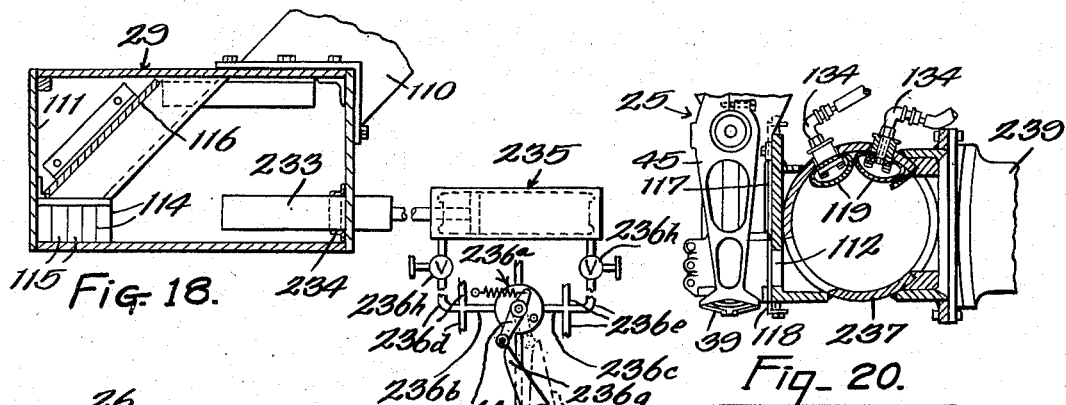
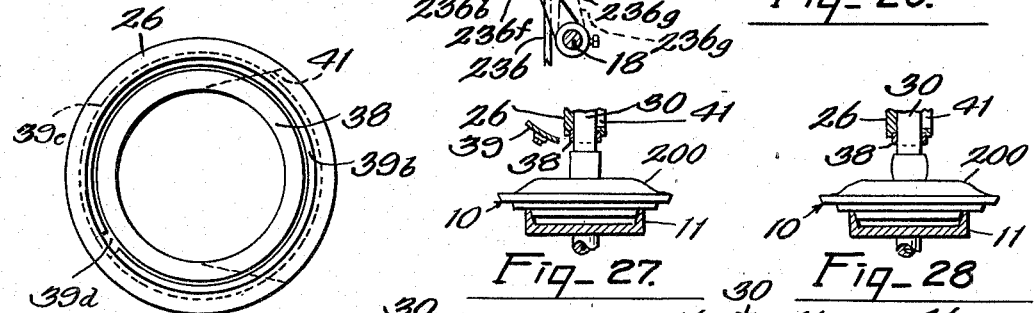
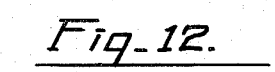
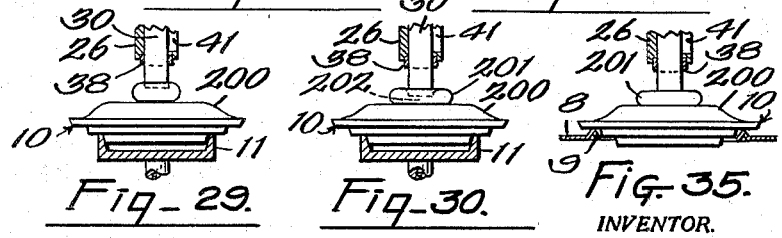
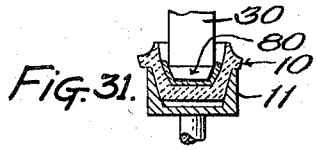
INVENTOR.
WILLIAM J. MILLER
BY
ATTORNEY.

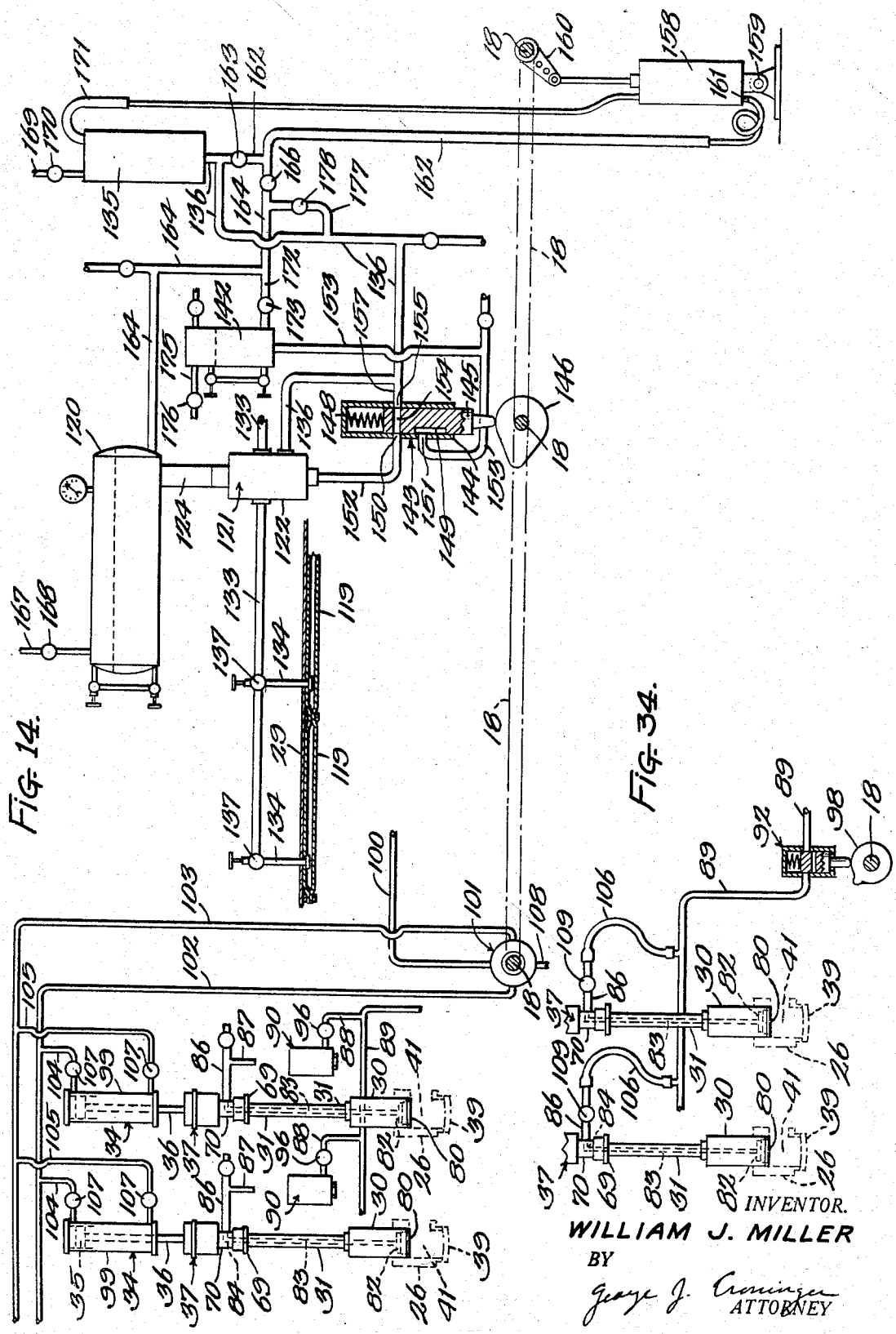

April 24, 1945.  W. J. MILLER  2,374,553
METHOD AND APPARATUS FOR FEEDING CLAY TO MOLDS
Filed Dec. 2, 1941  7 Sheets-Sheet 7
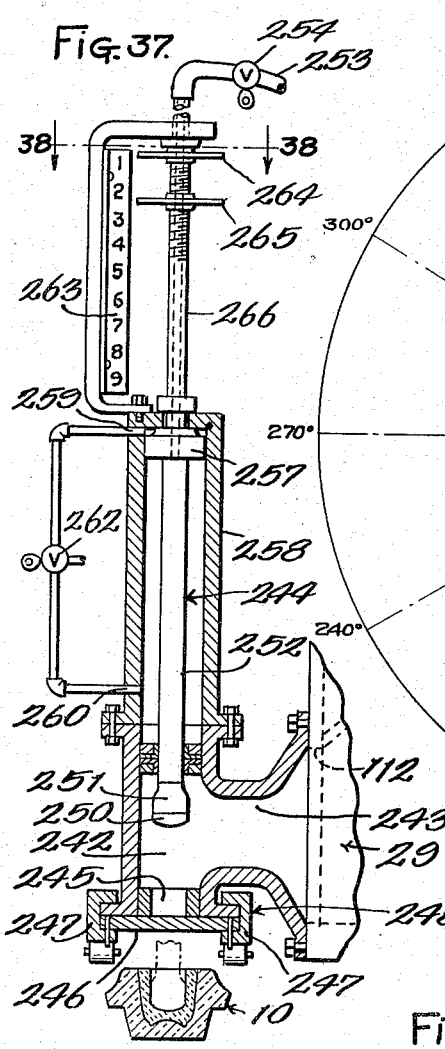
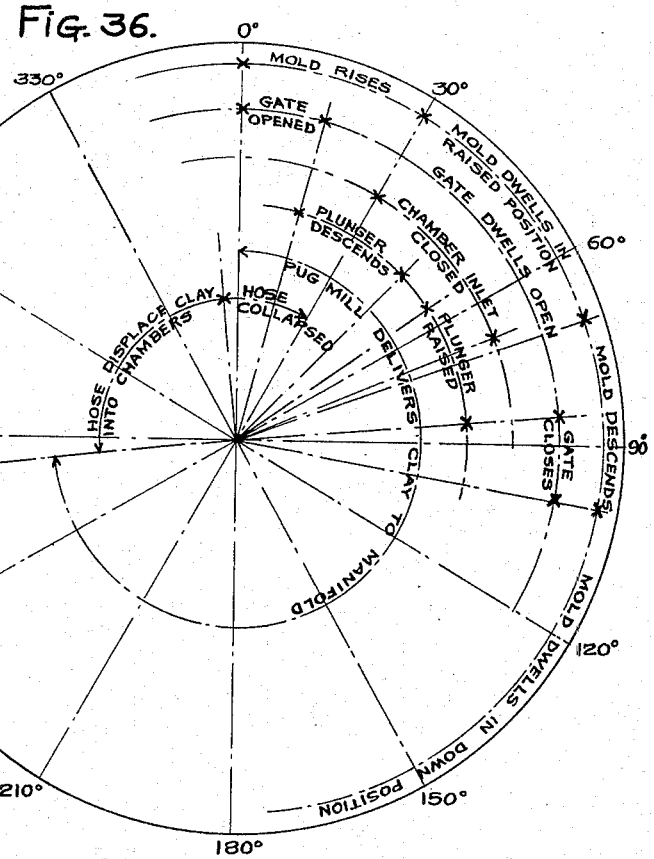
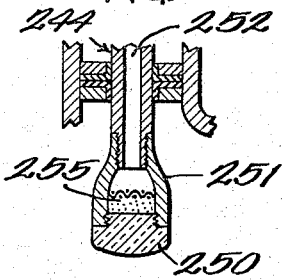
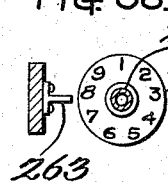
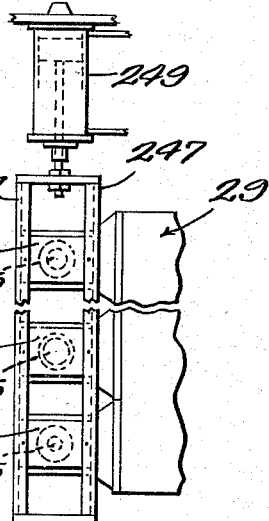
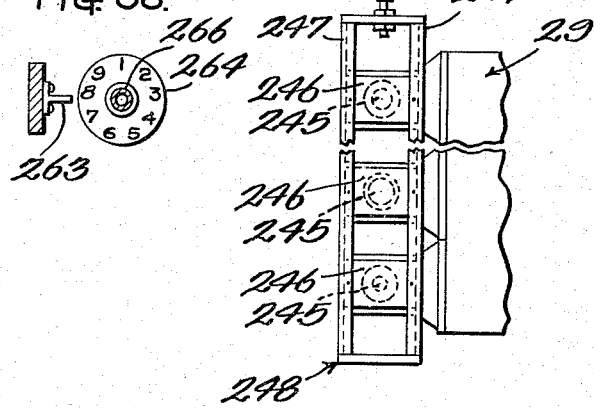
INVENTOR.
WILLIAM J. MILLER
BY
George J. Cranmer
ATTORNEY Patented Apr. 24, 1945

2,374,553

UNITED STATES PATENT OFFICE 2,374,553

METHOD AND APPARATUS FOR FEEDING CLAY TO MOLDS

William J. Miller, Swissvale, Pa., assignor to Miller Pottery Engineering Company, Swissvale, Pa., a corporation of Pennsylvania Application December 2, 1941, Serial No. 421,299

33 Claims. (Cl. 25—1)

This invention relates to methods and apparatus for the manufacture of pottery ware. It has to do particularly with feeding charges of plastic ceramic material to molds in the production of jiggered ware.

Heretofore, plastic jiggering clay has been mechanically fed to molds by apparatus operative to homogenize filter-pressed clay and deliver it to a manifold having outlets through which the clay is forced into delivery chambers. From these chambers, the clay is ejected, for instance, by a plunger, into or onto the molds. To homogenize and deliver the clay to the manifold, it is customary to use a conventional pug mill, but it has been found that the force delivered by the pug mill auger is variable and of insufficient value to quickly flow the clay into and completely fill the delivery and measuring chambers, particularly those most remote from the auger tip. Furthermore, the internal shape and design of the manifold has not been as highly efficient as it might be in promoting a flow of clay such that the delivery outlets would be quickly and completely filled. Owing to these factors, the rate of production and delivery of charges is not as great as it might be and one object of this invention is to increase the output of properly measured and proportioned charges within a given interval to thereby proportionately increase ware production. Another object is to affix the charge to the molding surface by pressing it thereagainst incident to deposit thereon, thus preventing dislodgement or displacement due to movement of the mold between stations.

According to my invention, I pug the clay in a conventional pug mill and deliver it to a manifold by means of the customary unreliable auger, however, I provide auxiliary positive and reliable impeller means for cooperating therewith periodically in applying controlled pressure to the clay in the manifold to cause the clay to reliably move, with greater rapidity than heretofore, into and completely fill the measuring chambers. The auxiliary force is applied only for such shortest practical intervals as is necessary to insure proper and complete filling of all measuring delivery chambers associated with the manifold.

The manifold represents an improvement in that it is designed to effect a more reliable and uniform flow and distribution of clay to the various outlets. The construction is such that during each feeding cycle of the apparatus, the capacity of the manifold is rapidly decreased to expedite the flow of clay through the outlets and then gradually, or otherwise, increased by force of clay inflow from the pug mill whereby the pug auger may rotate continuously instead of intermittently as in the systems of the prior art. As a result of this, the clay in the manifold will not only be maintained under pressure at all times, but the time usually lost in stopping and starting the pug mill as heretofore required, is saved. Besides this, by holding pressure on the clay, there is no time nor energy lost periodically building up a pressure head with which to start the clay flowing into the outlets.

The present clay feeding system is substantially closed to atmosphere and the clay is protected from air-borne contamination and loss of moisture until it issues from the system in the form of a charge. Instead of the outlets of the delivery chamber being open at all times, as heretofore, in the present system, they are closed during at least the interval while the chambers and manifold are being filled. As a result, the clay is packed solidly into the delivery chamber to thereby insure the full bulk of clay in the charge. Furthermore, in that a certain amount of back pressure is applied to the clay in the manifold at all times, undue expansion of the clay is prevented as it moves into the manifold from the pug mill. This greatly eliminates the possibility of molecular separations in the clay which might promote the development of flaws and laps in the clay imparted thereto by the pug mill auger, particularly in the case of vacuumized clay.

In the drawings:

Fig. 1 is a side elevation of the preferred form of clay supplying apparatus mounted on the frame of a multiple line automatic forming machine.

Fig. 2 is a plan view of the apparatus shown in Fig. 1.

Fig. 3 is a front elevation, partly in section, of one of the feeders.

Fig. 4 is a side elevation of the feeder shown in Fig. 3.

Fig. 5 is a rear elevation of the feeder shown in Fig. 3.

Fig. 6 is a horizontal section taken on the section line 6—6 of Fig. 3.

Fig. 7 is a horizontal section taken on the section line 7—7 of Fig. 3.

Fig. 8 is a horizontal section taken on the section line 8—8 of Fig. 3.

Fig. 9 is a bottom plan view of the feeder of Fig. 3.

Fig. 10 is a perspective view of the feeder frame.

Fig. 11 is an enlarged vertical sectional elevation through the charge forming chamber showing the plunger and the closure for the chamber.

Fig. 12 is a bottom plan view looking into the charge forming chamber.

Fig. 13 is an enlarged detail vertical section taken on the section line 13—13 of Fig. 2.

Fig. 14 is a piping diagram illustrating the hydraulic system for force feeding clay into the individual feeders, and the pneumatic system for the plungers.

Fig. 15 is a sectional elevation of a control valve used in the hydraulic system shown in Fig. 14.

Fig. 16 shows a modification in the valve of Fig. 15.

Fig. 17 shows a modified form of plunger head.

Fig. 18 shows a modification in the apparatus for force feeding clay into the delivery chambers.

Fig. 19 shows another modification in apparatus for force feeding clay into the delivery chambers.

Fig. 20 is a section taken on the section line 20—20 of Fig. 19, with the plunger feeder shown in full lines.

Fig. 21 is a fragmentary detail showing how the extrusion machines in Fig. 19 may be mounted in endwise relation to the manifold.

Fig. 22 is a front elevation of an extrusion machine and manifold illustrating a pressure relief system therefor.

Fig. 23 is a top plan view of the apparatus of Fig. 22.

Fig. 24 is an enlarged detail section taken on the section line 24—24 of Fig. 23, illustrating one of the pressure relief devices employed.

Fig. 25 is a sectional view of another form of pressure relief device for the manifold.

Fig. 26 is an enlarged vertical sectional elevation of a control valve employed in the pneumatic system for the feeder plungers.

Figs. 27, 28, 29 and 30 illustrate, in sequence, the operation of applying a charge of clay to a flatware mold.

Fig. 31 illustrates a hollow ware mold and a type of plunger therefor in operative position therein, with the mold shown in section.

Fig. 32 is an enlarged fragmentary detail of the clay-engaging surface of the form of permeable end part of the plunger shown in Fig. 17.

Fig. 33 is a section taken on the section line 33—33 of Fig. 32.

Fig. 34 is a piping diagram of a modified form of pneumatic system for the feeder plungers.

Fig. 35 is a view showing the mold of Fig. 30, supported on a tray instead of a chuck while receiving the charge of clay.

Fig. 36 is a cycle chart showing the sequence of operation of the various devices of the machine.

Fig. 37 is a sectional elevation of a modified form of feeder.

Fig. 38 is a plan section taken on the section line 38—38 of Fig. 37.

Fig. 39 is a reduced bottom plan view of the feeder of Fig. 37.

Fig. 40 is an enlarged sectional detail of the plunger shown in Fig. 37.

The clay supplying apparatus and method of the present invention is, for illustrative purposes, shown and described herein as applied to a high-speed multiple line mass producing jiggered dinnerware forming system, wherein the plaster molds are transported by means of a conveyor to feeding, forming and jiggering positions and then through a dryer in similar fashion to that shown in my United States Letters Patent Nos. 2,046,525 and 1,868,425. It will be understood that the feeding apparatus and method hereof are not limited to use in connection with multiple line systems of this description.

In Figs. 1 and 2, the mold conveyor comprises a pair of spaced parallel sprocket chains 1, supported adjacent the feeding station A between longitudinal side-frame sections 2 of the machine by guide-rails 3 and sprockets 4 on a shaft 5, spaced from the downwardly curved ends 6 of the rails 3. Pivotally suspended between the chains are trays 8 with open mold stands or seats 9 for the molds 10. The molds of each tray are for making similar or diversified hollow ware and/or flat ware, and form with the molds of the other trays a plurality of parallel lines of production, each line preferably having molds adapted to produce ware of a given weight generally, although the molds may not have the same molding surface contour.

The conveyor moves continuously through the dryer (not shown) but in the zone of the feeding station A and fabricating stations (not shown) is intermittently halted in order to center a tray load of molds over a group of elevatable chucks 11 for the purpose of lifting molds from the mold stands into operative adjacency to the feeders and forming tools. The open seats 9 of the trays are slightly larger in diameter than the mold chucks to permit same to move upwardly therethrough when raised. In order to provide for such intermittent movement in this portion of the conveyor, said conveyor may be constructed in accordance with the disclosure of my United States Letters Patent No. 2,046,525, wherein the conveyor chains are provided with a slack section illustrated herewith by the loop 12 formed in the chains between the sprockets 4 and the ends 6 of the guide rails 3. When the tray 8 comes to rest at the feeding position, the chain portion adjacent the guide-rails 3 is also halted while the sprockets 4 continue to rotate. To keep this loop section of the chains taut, they are weighted down by idler sheaves 14 on a vertically floating shaft 15, whereby each time the chains are pulled to the left (see arrow, Fig. 1), the sheaves are raised as the slack is pulled out of the chain.

The mold chucks are mounted on a crosshead 16 which is mounted for vertical reciprocation upon suitable guides 17 which also serve as uprights supporting the frame sections 2. The chucks are raised and lowered in timed relation with the movements of the conveyor by suitable means including a constantly rotating cross-shaft 18 on which is a cam 19 operating through suitable linkage 21, a pair of levers 22 connected with opposite ends of the cross-head, 16, respectively, and pivoted to the machine frame at 23.

The shaft 18 is driven by an electric motor 20 through an adjustable speed-reducer 24.

The mold charging apparatus disclosed herein in carrying out one form of the invention, comprises a bank, or series, of mold feeders 25 arranged respectively, above the molds on the trays when same are at the station A. Generally, each mold feeder includes a replaceable upright measuring and charging cylinder 26 (Fig. 11) supported above the path of the conveyor in coaxial alignment with a mold chuck 11, and from which a measured charge of the clay is forcefully deposited onto the center of the molding surfaces of the molds when same are raised by the chucks. To this end, as seen in Figs. 3, 4 and 5, the charging cylinder 26 of each device is detachably mounted within a lower split bearing portion 27 of an upright frame 28, supported on a manifold 29 mounted on the machine frame. The cylinder 26 is held in proper angular position within the split bearing by a pointed set screw 29a threaded into the bearing wall and engaging in an indentation 29b in the cylinder wall. To permit slight adjustment of the cylinders into coaxial alignment with the mold chucks, each feeder frame is secured on the manifold by bolts 29c passing through oversize bolt holes 29d in bosses 29e of the frame, and the manifold is secured on the machine frame by bolts 29f which pass through oversize holes in the base portion 29g of the manifold. Operating within the charging cylinder 26 is a hollow charge-ejecting plunger 30 secured to the bottom end of a plunger rod 31 slidably supported in a bearing 33 of the charger frame 28. For providing a seal between the cylinder and plunger, the plunger operates within a pair of opposed flanged packing rings 33a held within an annular recess 33b in the top of the cylinder by a ring nut 33c threaded in the recess.

The plunger is reciprocated by a fluid-pressure operated motor 34 mounted on the top of the feeder frame and within which operates a piston 35 on a piston rod 36 which operates the plunger through a lost-motion connection 37 connecting same with the plunger rod 31 of the plunger.

At the bottom end of the charging 26 is detachably secured a nozzle 38 forming the charging outlet which is normally sealed by a movable closure or gate 39. The nozzle is detachably held within an annular recess 39a in the bottom end of the cylinder by a split ring 39b received within an annular groove 39c in the wall of the recess and engaging a flange 39d of the nozzle. The nozzle is held in proper position angularly with respect to the cylinder by a dowel-pin 39e cooperating therebetween. When the plunger is raised, the gate is closed to form with the bottom end of the plunger a charge-measuring and delivery chamber 41 within the charging cylinder 26 which is provided with an inlet 42 in its side wall through which the clay is fed under pressure into the chamber from the manifold 29, which has means therein to cause the clay to gush or surge forward expeditiously and uniformly into the chambers from the manifold. A clay extrusion device or pug mill 43, as seen in Figs. 1, 2 and 13 delivers clay to the manifold.

The gate 39 has a replaceable facing 44 (see Fig. 11) and is connected between the bottom ends of a pair of levers 45 fulcrumed, as at 46, on the reduced ends of a cross-pin 48 supported in bearings 49 of the charger frame 28, the pin having a central enlarged opening 50 through which the piston rod 31 freely extends, as seen in Figs. 3, 4 and 7. The replaceable facing 44 of the gate and the outlet end of the nozzle 38 with which it cooperates to seal the measuring chamber are formed arcuately about the axis of the cross-pin 48 with a very slight clearance therebetween for venting the chamber as it is being filled with clay and to permit movement of the gate to open position after the chamber is filled. The facing 44 may be held on the gate by means of a threaded stud 49a extended through a central aperture in the gate and a nut 49b on the stud engaging the gate, or the facing may be cemented on the gate if desired.

The outlet nozzle 38 is slightly smaller in diameter than the measuring chamber 41 and has an inner lining 51 of an abrasive resistant material, such as an alloy of cobalt and chromium or nickel to insure a close fit with the feeder plunger to prevent a film of clay from forming on the side of the plunger as it passes through the nozzle during a charging operation and then being stripped from the plunger, as it raises, to fall onto the charge of clay and cause marks or imperfections in the finished ware. To insure that the measuring chamber and its nozzle will be thoroughly cleaned of clay by the plunger as it descends, the plunger may have an annular groove 51a near its bottom end within which may be provided a piston ring 51b of resilient material, such as rubber, for yieldably wiping the walls of the chamber and nozzle, as seen in Fig. 17.

The gate 39 is also operated by the fluid-pressure motor 34, which, through the lost-motion connection 37 and cam means, opens the gate before the feeder plunger is lowered thereby to expel a charge of clay, and whereby the gate will be closed as the plunger is finally raised. For this purpose, on the piston rod 36 of the fluid motor is secured a cross-piece 52 from whose ends depend, respectively, elongated cam members 53 guided for vertical reciprocation, with said rod, between rollers 54 pivoted on the feeder frame 28. In the cam members 53 are cam slots 56 within which operate rollers 57 pivoted on upward extensions 58 of the gate levers 45. The cam slots have an upper cam-dwell portion 59 terminating in a lower angular portion 60 arranged to swing the gate to open position immediately prior to the charging stroke of the feeder plunger, and to swing the gate to closed position immediately following the return stroke of the plunger, the lost motion connection 37 making possible the necessary plunger dwell periods between movements of the gate.

The lost-motion connection 37 (see Fig. 3) includes an exteriorly threaded head 61 on the top end of the plunger rod 31, threaded into the lower end of an internally threaded connector sleeve 62 which has a centrally apertured top-end wall 65 through which the piston rod 36 of the fluid motor freely extends with an enlarged disc-like head 66 thereon confined for limited reciprocable movement between bumpers 67 and 68 arranged, respectively, under the top of the sleeve and upon the said head.

The lowermost position of the feeder plunger is determined by an adjustable stop nut 69 threaded on a threaded stem portion 70 of the enlarged head 61, and which limits the downward movement of the plunger by engaging a resilient bumper ring 72 on the bearing 33 of the feeder frame 28. The stop nut is held in adjusted position by having a series of vertical indexing grooves 73 about its periphery within one of which may be engaged the free end of a resilient finger or spring 74 anchored to the stem portion 70. Generally, the upward movement of the plunger is limited by the connector sleeve 62 engaging a resilient bumper 74a on the feeder frame 28. Also, the upper limit of movement of the plunger may be varied by rotating the connector sleeve 62 to raise or lower the head 61 and thereby regulate the capacity of the measuring chamber of the charging cylinder 26. For holding the connector sleeve 62 in adjusted position, one end of a resilient indexing finger 75 or spring, is anchored to the stem 70, the free end thereof being engageable within one of a series of vertical indexing grooves 76 formed about the periphery of the connector. Thus the uppermost limit of movement of the plunger may be determined independently of its lowermost limit which determines its approach to the molding surface of a mold to thereby define the thickness of the clay charge therebetween.

To visibly indicate the length of the cylindrical clay charge, the stem 70 of the enlarged head 61 of the plunger rod has an indicator 78 arranged in indicating relation to a vertical scale 79 arranged on the frame 28. To more accurately determine the length of the charges beyond that made possible by the scale, the adjustable stop nut 69 for each plunger serves as a vernier adjustment, as the indexing grooves therein are arranged thereabout and indicated thereon in sub-divisions of the smallest fractions of measurement of the scale.

As seen in Fig. 11, the plunger 30 of each feeder has a bottom-end portion 80 of permeable material through which air under pressure is directed during the final charge expelling movement of the plunger to repel the clay charge therefrom after it has been forced thereby onto a mold. To this end, the permeable end 80 of each plunger is in the form of a permeable disc which may be constructed of concrete, bronze or carborundum, and secured within a cavity 81 in the bottom of the plunger to form thereabove an air-pressure chamber 82 in the plunger. The disc is secured in the cavity by having an annular groove 82a registering with an annular groove 82b in the wall of the cavity to form an annular chamber within which is molded a locking ring 82c, of cement or solder, by way of a sprue 82d in the wall of the cavity. As seen in Figs. 3, 4 and 14, during the final downward movement of the plungers the pressure chambers 82 thereof are connected with a common source of air under pressure by way of a central passage 83 in each plunger rod, a passage 84 in the stem part 70 thereof, and a horizontal pipe section 86 extending therefrom with a depending inlet 87 which connects with a branch 88 (see Fig. 14) of a main air-pressure line 89 through a valve 90 which is arranged to be opened by the inlet during final downward movement of the plungers.

The valves 90 may be of the type shown in Fig. 26, wherein each includes a valve casing 91 connected at its bottom end with its respective branch 88 of the air pressure line, and in whose top end is a central outlet port 93 normally closed by a spring-pressed valve member 94 slidable in the housing. The valve is arranged so that as the inlet 87 of the pipe 86 is lowered, it enters the outlet port and opens same to establish connection therewith by depressing the valve member 94. A sealing ring 95 may be arranged in the outlet port 93 to provide a sealed connection between same and the inlet 87. To control the pressure of the air to be admitted through the valves 90 into the air-pressure chambers of the plungers, in each branch 88 of the main air-pressure line may be interposed a throttling valve 96 (see Fig. 14).

Instead of employing individual valves 90 for controlling the admittance of air pressure through the charger plungers, this may be accomplished by interposing a slide type shut-off valve 92 in the air-pressure line 89 and operated by a cam 98 on the cross-shaft 18, as seen in Fig. 34. In this case, the air pressure line would have flexible branches 106 connecting with the pipes 86 leading from the plunger rods, with a throttle valve 109 interposed in each pipe to regulate the flow of air through the plungers individually.

Confined in the air-pressure chamber 82 of each plunger (see Fig. 11) is a filter pad 97 to prevent dirt or other foreign matter, that may come through from the main air pressure line, from clogging the very minute openings in the permeable disc 80 of the plunger or contaminating any clay that may be adjacent thereto.

To determine the contour of the upper surface of a clay charge after it has been pressed by a plunger onto a mold, the charge-engaging surface of the permeable disc 80 of the plungers may be contoured accordingly, wherein it may be flat, as shown in Fig. 11, to accommodate a flatware mold, or rounded, as seen in Figs. 17 and 31, to accommodate a hollow ware mold.

The fluid-pressure motors 34 are caused to actuate the charger plungers 30 when the molds are raised by the chucks 11, to effect the charging operations, by the opposite ends of the cylinder 99 of each motor being alternately connected with a main fluid pressure line 100 (see Fig. 14) by way of an ordinary continuously actuating four-way valve 101 from whose two opposite service ports continue conduits 102 and 103 connecting with the ends of the cylinders, respectively, through branch conduits 104 and 105. In each of these branch conduits may be a throttling valve 107 for controlling the flow of air into the motor cylinders in regulating the rate of reciprocation of the charger plungers. The valve 101 is of the ordinary rotary type whose rotor may be mounted on one end of the cross-shaft 18 to be constantly rotated thereby, the valve also having a vent port 108 to vent one end of the fluid motor cylinders when the fluid under pressure is admitted into the other end thereof.

The manifold 29 supplies clay to the measuring chambers of the various feeders through its several outlets and is designed to distribute the clay from the pug mill 43 into the measuring chambers of the feeders at a uniform rate and under a uniform pressure. For this purpose (see Figs. 1, 2 and 13) the manifold is in the form of an elongated box extending across the side frames 2 of the machine frame, and into which clay is directed from a source of clay supply, herein disclosed as a pug mill, through an inlet duct 110 which extends upwardly and rearwardly from the rear central portion of the manifold. The pug mill is illustrative of only one form of device which may be used. Vent cocks 110a may be provided along the top of the manifold to bleed air therefrom when initially filled with clay (see Fig. 13). If desired, clay may be packed in large cylinders and forced therefrom by means of a ram into the manifold.

Extending across the bottom portion of the front wall 111 of the manifold is a series of outlets 112 connecting with the inlets 42 of the measuring chambers of the feeders. Inside the manifold, baffles 114 are arranged at each side of the outlets to form a series of outwardly diverging or tapered throats 115 which progressively become narrower and longer from the ends of the manifold to the center thereof. Clay is directed forward and downward in the manifold toward the outlets by a V-shaped front baffle wall 116 in the manifold which tapers inwardly toward the center thereof and extends inwardly and upwardly to the top of the manifold from the entrance ends of the throats 115. Said baffle wall 116 and inlets of the throats 115 are so arranged and proportioned that clay will be forced through all of the outlets at a substantially uniform rate and pressure from the manifold due to the fact that the capacity of the manifold progressively increases toward each end thereof, thus providing at each end a freer flow or less retarded area toward which the clay will readily flow from the central relatively more restricted pressure area of the manifold. Therefore, as the narrower longer throats 115 adjacent the center of the manifold offer greater resistance to the clay passing therethrough from the high pressure area of the manifold than the shorter and wider throats offer to the lower pressure areas of the manifold, the clay will be forced into all of the measuring chambers at a substantially uniform rate and under a substantially uniform pressure.

In that the clay bulk demand of the feeders may differ considerably in accordance with the type of ware for which the charges are intended, valve means is provided for regulating the flow of clay into the chambers thereof to insure that the filling of all of them will be initiated simultaneously and concluded simultaneously to reduce chamber filling time to a minimum extent and thereby increasing manifold filling time to a maximum extent for each cycle of operation of the machine. As seen in Figs. 4, 5, 7, 8 and 9, said valve means comprises upper and lower slide valve members 117 and 118 in the form of vertical plates arranged for vertical adjustment with respect to each other, in between the inlet 42 of each measuring chamber and its adjacent outlet 112 of the manifold to provide a port or passage 118a therebetween which may be varied in area in accordance with the demand of the measuring chamber. The valve plates are mounted for adjustment between guide portions 11b of the feeder frame 28 and the front wall of the manifold. Each valve plate is adjusted by an adjusting screw 118c threaded into a wall portion of the manifold and having a reduced neck portion 118d received in a slot 118e in an angular end portion 118f of each plate. These valve members 117 and 118 may be employed supplementary to the varying throats 115, or they may be substituted for the throats, if desired, and under certain conditions, only one of the members may be required to effect the proper result.

The clay is forced into the manifold from the pug mill 43 by an auger or feed screw arranged in the mill and which usually cannot be relied upon to exert a uniform pressure on the clay. Therefore, to insure that the measuring chambers are completely filled and solidly packed with clay, during the relatively short period within which this operation is confined, I provide means operating independently of the auger for developing a periodically recurring increase in pressure on the clay in the manifold to produce a quick gushing movement thereof through the outlets and into the charge measuring chambers of the feeders. Said means, in the preferred form, constitutes clay displacement devices and comprise a series of interconnected hose sections 119 or pulsators arranged in the manifold and mounted on the rear wall thereof opposite the throats 115, which pulsators are periodically inflated to displace and urge the clay in the manifold toward the outlets, as seen in Figs. 2 and 13.

By virtue of the central restricted area and free flow areas of the manifold, the operation of the pulsators will not cause packing of the clay on the compacting side of the pug mill auger to a greater extent than that making possible efficient operation of the machine.

The clay displacing hose sections are intermittently inflated by a fluid, under pressure, and for this purpose, as seen in Fig. 14, a supply tank 120 is provided with a supply of fluid, preferably water under a given pressure, into communication with which the devices are brought by way of an intermittently operated three-way control valve 121. To this end, as seen in Figs. 14 and 15, the valve 121 comprises an elongated upright cylindrical casing 122 having an upper receiving chamber 123 connected with the tank 120 through a conduit 124, a central supply chamber 125 communicating with the receiving chamber through a valve port 126 in a wall therebetween and being in connection with a lower vent chamber 127 of the casing through a valve port 128 in a wall therebetween. In the valve casing is a reciprocating valve stem 130 on which are poppet valve members 131 and 132 arranged to control the ports 126 and 128, so that when the stem is raised, the port 128 will be closed and the port 126 open, whereby fluid in the supply chamber will flow into the displacement hose sections 119 to inflate same by way of two conduits 133 and branches 134 leading therefrom. When the valve stem is lowered, the valve ports 126 and 128 are closed and opened respectively, whereby the fluid in the hose sections is exhausted therefrom into a water reservoir 135 by way of the vent chamber 127 and a conduit 136 leading therefrom, as the pressure of the clay flowing into the manifold from the pug mill causes the hose sections to collapse. In each branch 134 of the conduits 133 may be a throttling valve 137 to control the flow of fluid to the hose sections, for regulating the rate and extent of expansion thereof in accordance with the clay bulk demand of the measuring chambers of the feeders toward which the clay in the manifold is displaced thereby. By so regulating the extent of expansion of the hose sections, all feeders may be supplied simultaneously within the shortest possible time regardless of the extent to which their clay bulk demand varies.

The valve stem 130 is so operated as to cause the hose sections 119 to quickly expand and urge clay into the measuring chambers, then instantly release the fluid pressure in the hose whereby clay progressing pressure will cease and movement of the clay through manifold outlets will be halted prior to and during the opening of the gates, the ejection of the charges, and closing of the gates. This prevents the clay from gushing through the outlets and nozzles of the measuring chambers between the time the gates are opened and the plungers descend sufficiently to close the outlets, to insure that only such clay as is confined in the chambers will be ejected therefrom. To this end, the valve stem has a piston 140 thereon arranged within a power chamber 141 in the valve casing 122 and into which fluid under pressure, such as water, is intermittently admitted and exhausted therefrom to cause reciprocation of the stem, by the chamber being alternately connected with a supplemental water-pressure supply tank 142 and the reservoir 135 through an ordinary three-way control valve 143. (See Fig. 14.) The valve 143 is of the slide type including a cylindrical valve casing 144 within which reciprocates a valve member 145 actuated by a cam 146 on the shaft 18, with a spring 148 confined between the end wall of the casing and the member to maintain same in engagement with the cam. At one limit of movement of the valve member 145, it connects the power chamber 141 of the valve 121 with the supplemental tank 142 through a port-slot 149 in a side thereof which connects two ports 150 and 151 in a side-wall of the valve casing 144 and connecting with the power chamber and supplemental tank, respectively, through piping 152 and 153. At the other limit of movement of the valve member 145, it connects the power chamber and reservoir through a port 154 therein connecting the pipe 152 of the chamber with an exhaust port 155 in a wall of the valve casing and which connects with the reservoir through a pipe connection 157 with the piping 136, whereupon the fluid will be exhausted from the power chamber as the valve stem 130 is lowered by force of gravity acting thereon. However, the valve stem 130 may be positively moved in both directions by the fluid under pressure. In this case, as seen in Fig. 16, the piston 140 of the valve stem may operate within a cylinder insert 138 in the bottom end of the valve casing 120, with both ends of the cylinder being alternately connected with the fluid pressure line through conduits 147 and 156, respectively, by way of a four-way slide valve substituted for the valve 143.

A given amount of water, under pressure, is substantially maintained in the supply tank 120 by same being supplied from the reservoir 135 by means of cylinder-and-piston type pump 158 whose cylinder is pivotally supported at one end, as at 159 and whose piston is reciprocated by a crank 160 on the cross-shaft 18. (See Fig. 14.) During operation of the pump, water is drawn therein from the reservoir through the chuck-valve-controlled port 161 of the pump by way of piping 162 connecting with piping 136 and in which is a check valve 163 arranged to direct the water flowing through said piping from the pump under pressure into the tank 120 by way of piping 164. In the piping 164 is a check valve 166 for checking the flow of water from the tank 120 back into the pump upon the return stroke of its piston.

To control the level of the water in the supply tank 120, and whereby an air pressure chamber may be maintained above the water to exert uniform pressure thereon to cause same to be quickly ejected into the clay-displacing hose sections 119, the top of the tank may connect with a source of air, under pressure, through piping 167 in which is a throttling valve 168 to control the amount of water pressure desired.

Water may be maintained in the reservoir 135 by way of conduit 169 leading therefrom to a water supply main, with a throttle valve 170 therein to control the amount of water to be supplied. Also, the top of the reservoir may be connected with the vent chamber of the pump by way of a flexible conduit 171 whereby any water seeping past the pump piston may be carried back into the reservoir.

A given amount of water, under pressure, is maintained in the supplemental tank 142 by same being connected with pump 158 through a pipe connection 172 connecting the tank with the piping 164, with a check valve 173 in said connection for checking the flow of water from the tank back into the pump or supply tank 120. To control the level of the water in the supplemental tank, and whereby an air pressure chamber may be formed above the water to maintain same under a given uniform pressure, the top end of the tank may connect with any suitable source of air, under pressure, by piping 175 in which is a throttle valve 176 to control the amount of water pressure desired.

The pump 158 is arranged to have a capacity somewhat in excess of that required to compensate for the amount of water flowing from the tanks 120 and 142 in causing operation of the hose sections 119, the excess water flowing from the pump back into the reservoir 135 by way of piping 164 and a by-pass connection 177 leading therefrom into piping 136, to insure that the proper amount of water will be maintained in the tank. The by-pass continues from the piping 164 at a point between the check valve 166 therein and the tanks whereby said check valve will direct the overflowing water from said piping into the by-pass. In the by-pass is a check valve 178 normally functioning to prevent water being exhausted from the valves 121 and 143 through piping 136 from returning to the supply and supplemental tanks by way of the by-pass, while allowing the passage therethrough of excess water from the pump.

The pug-mill 43 may include a conventional horizontally disposed clay-conducting cylinder 180 whose elongated base extends across and is mounted upon the side frame 2 of the machines, as seen in Figs. 1 and 2. In the top wall of the pug cylinder near its rear end is a filling opening 181 into which clay filter cakes are charged into the cylinder where they are cut up and progressed inward thereof by a series of rotating macerating knives 182 and an auger or feed screw 183 secured on a rotating shaft 184 arranged centrally in the pug cylinder As the clay is progressed in the pug cylinder, it is fed into the manifold 29 by way of the inlet duct 110 thereof and the reduced inner end 185 of the pug cylinder which connects therewith.

Instead of the form of pug mill, just described, other types may be employed as well, such as, an upright type or one having a vacuumizing attachment interposed between it and the manifold for reducing the air content of the clay.

Also, the pug mill may extend rearwardly of the manifold with its feed-end connected directly therewith at the center of the back wall of the manifold as seen in Figs. 22 and 23.

Means is provided to be effective during operations of the clay displacement devices 119 to prevent same from exerting a charging or gushing pressure on the clay in the manifold beyond a predetermined amount and which will function during operation of the pug mill to cause otherwise sluggish flow zones of the manifold to be completely replenished with clay. For this purpose, as seen in Figs. 22, 23 and 24, in the top wall of the manifold at the center and ends thereof may be provided pressure relief ports 187 from which extend clay conduits 188 continuing into a common depending outlet 189 over the inlet opening 181 of the pug mill. Controlling each port 187 is a pressure relief valve 190 which is arranged to open when the charging pressure of the clay in the manifold increases beyond that desired, whereby the overflow clay will flow through the conduits 188 back into the pug mill. As these valves 190 serve to automatically vent those regions of the manifold that ordinarily may be considered sluggish flow zones during the filling of the manifold, the complete replenishment of fresh clay into these zones will be assured.

The relief valves 190 may be of a common type including an L-shaped valve casing 191, having a port 192, forming an extension of a relief port 187 and normally closed by a spring-pressed poppet valve member 194 having a stem 195 guided in a bearing 196 of the valve casing, the member being actuated by a coiled spring 197 surrounding the stem and interposed between the bearing and poppet valve member. To determine the charging pressure of the clay in the manifold, the resistance of the valve members 194 may be regulated by the bearing 196 of each being in the form of an exteriorly threaded bushing threaded into the valve casing 191 for adjustment in regulating the tension of the spring 197.

Thus an improved clay supplying system has been provided wherein the body of clay within the manifold is alternately under a primary pressure head exerted by the pug mill, and under supplemental pressure delivered by the pulsator which causes the clay to move rapidly from the manifold through the outlets thereof into the measuring chambers of the feeders within a very short period of each charging cycle. Also, during filling of the measuring chambers, any air therein will vent between the gate and outlet nozzle of the chambers and through the permeable end of the plunger, whereby the clay will be packed solidly in the chambers by action of the displacement devices.

Immediately after the clay is packed solidly in the measuring chambers, the pulsators are deflated, and immediately thereafter the gates are opened, the plungers lowered and raised and the gates closed, preferably all in very rapid succession, whereby the charge of clay will be quickly deposited onto the ware forming surface of the molds therebelow. It is preferred to lower the plungers after the supplemental pressure delivered by the pulsators has been relaxed so as to remove side thrust of the plunger and prevent wear.

During this charging operating, the pug mill auger operates continuously to force clay into the manifold until the voids left therein by the displacement device are completely filled.

As seen in Figs. 27 to 30, when the molds are raised by the chucks 11, they are held in predetermined elevated position in co-axial alignment with the outlet nozzles of the measuring chambers, whereby as the feeder plungers are lowered, the rounded clay charges are ejected thereby from the chambers and compressed onto the molding surfaces 200 of the molds in exact co-axial alignment therewith and assume a doughnut-like shape presenting a rounded ring-like peripheral portion 201 connected by a thin depressed central flat portion 202. However, it is also contemplated to feed the charges onto the molds while same are seated on the trays, as seen in Fig. 35.

By so definitely shaping and measuring the charge bulk before it is exposed to atmosphere, then gripping it incident to its being deposited onto a molding surface, then spreading and reforming thereon to a predetermined shape optimum to final definite marginal spreading, and incident thereto pressing the charge into adhering connection with the mold to prevent its displacement thereon while being rapidly transported to and operated upon by a final spreading definitely contoured die, insures spreading the charge radially to a uniform and optimum extent and thickness for jiggering without providing the conventional 35 per cent excess clay bulk in each charge to insure full mold coverage and adequate blank thickness capable of resulting in a perfect article after jiggering. Thus, the apparatus may meet the requirements of maximum mass production with a minimum amount of clay supply due to the manner in which the clay supply is conserved.

The invention contemplates a form of construction for the permeable end parts of the charger plungers wherein the minute pores in the clay engaging surface thereof will not tend to become clogged with very small particles of clay and reduce the permeability of the parts. This form of construction is shown in Figs. 17, 32 and 33, and comprises an interior body portion 204 made up of a coarse grained material, such as, .030" round sand particles, over which is provided a thin exterior layer 205 of very fine grained material, such as .002" round sand particles, which latter and former sand particles are held together by a minimum amount of binder to increase the permeability of the part. To further insure against cloggage of the very small pores of the exterior layer by particles of clay, this layer may be provided with a very thin and finely reticulated facing 206 of resilient material capable of checking the intrusion of very small clay particles therethrough. This facing may be in the form of a thin adhesive coating of rubber elastic paint, or the like, which, incident to drying, is subjected to air, under pressure, passed through the end part from the back thereof to cause those portions of the layer between the fine sand particles of the exterior layer to burst and thus form intersecting cracks 207 therein to provide very minute valve-like flaps 208 arranged to prevent clay particles from passing through the layer while allowing air, under pressure, to pass therethrough during ejection of a clay charge therefrom. Furthermore, this reticulated facing would also be very effective in preventing intrusion of clay particles into the body of the end part in the event it is desired to vacuumize the measuring chamber by way of said part to insure the complete filling of the chamber and the expedition of the filling operation. The reticulated facing may also be in the form of a thin covering of organic or inorganic material, such, as, for example, filter cloth, leather, metallic or fabric gauze or the like.

This form of plunger end construction also has the advantage of presenting less resistance to the air passing therethrough than it would if the part was entirely constructed of fine-grained material, whereby said construction becomes very suitable for such end parts that have a considerable mass of body portion, as that seen in Fig. 17.

It is contemplated to construct the pug mill 43 whereby it will be capable of feeding clay into the manifold under a primary pressure and then increased pressure to cause same to rapidly gush into the measuring chambers, in which case the clay displacement devices 119 may be dispensed with or serve to supplement the pug-mill, as desired. To accomplish this, the feed screw or auger 183 of the pug mill is not only continuously rotated, but is reciprocated in the pug casing also to impart the increased pressure on the clay sufficient to cause same to gush into the measuring chambers during a very short period of each cycle of charging operating of the machine. In this form, as seen in Fig. 23, the auger is reciprocated by a cylinder-and-piston type fluid motor 210 whose piston 211 is mounted on the outer end of the auger shaft 184, while the auger is constantly rotated by an electric motor 214 through an elongated pinion 215 on the motor shaft meshing with a gear 216 on the auger shaft. For operating the fluid motor, the ends thereof may be alternately connected with a source of fluid, under pressure, during each cycle of operation of the machine by way of a conventional four-way valve and conduit system like that employed for operating the fluid motors 34 of the chargers.

Another form of clay pressure controlling means for the manifold is shown in Fig. 25, wherein the feeding operation of the pug mill is stopped in the event the increased charging pressure of the clay in the manifold is increased abnormally beyond a predetermined limit which would be detrimental to the normal operation of the machine. In this form, the top of the manifold has an opening 221 over which is mounted the spring-pressed diaphragm 222 of a pressure-operated switch 223 interposed in the electric circuit 224 of the electric motor 214 of the pug mill, which switch is designed to open the circuit of the motor only when pressure of the clay in the manifold overcomes a predetermined resistance of the diaphragm. The diaphragm operates the switch through a switch stem 225 whose enlarged bottom-end 226 engages the diaphragm under pressure of a coiled spring 227 arranged on the stem between the enlarged end thereof and a bearing 228 therefor in a cup-like housing 230 which is secured about the opening 221 of the manifold with the diaphragm clamped therebetween. To regulate the resistance of the diaphragm 222, the bearing 228 may be in the form of an exteriorly threaded bushing threaded into the wall of the housing for adjustment to regulate the tension of the spring 227. This switch 223 may therefor constitute a safety device which will permit the pug-mill to continuously feed clay into the manifold only as long as the pressure of the clay therein is maintained below a predetermined maximum limit.

The manifold may have a number of such openings 221 spaced along the top thereof in cooperative connection with a number of such diaphragms 222 arranged to collectively operate a single switch 223 in the motor circuit to prevent the opening of the motor circuit in the event clay in a certain zone of the manifold is momentarily under an abnormal pressure before the clay is uniformly distributed to the other lower pressure zones. This may be accomplished by operably connecting the diaphragms with the single switch through suitable linkage (not shown) cooperating between the stems 225 of the diaphragms and the switch and arranged to cause the opening of the switch only when all the stems are actuated.

Another form of clay displacement means for the manifold is shown in Fig. 18. In this form, displacement devices 233 are provided and may comprise a plurality of horizontally extending rams reciprocably mounted in suitable bearings 234 arranged in the rear wall of the manifold opposite the outlets thereof, with cylinder and piston type fluid motors 235 provided for operating the rams to cause same to force clay into the measuring chambers.

The fluid motor 235 may be energized from a main fluid pressure line 236 by way of an oscillating type of four-way valve 236a from whose opposite service ports continue conduits 236b and 236c connected with the opposite ends of the cylinders of the motors by way of branches 236d and 236e of the conduits respectively. For operating the valve 236a to cause reciprocation of the rams within the very short period of each cycle of operation of the machine to which their operation is confined, the valve has a spring pressed valve operating lever 236f which may be actuated by a pointed cam 236g on the shaft 18.

To vary the rate and extent of reciprocation of the rams commensurately with the clay bulk charge demand of the feeders toward which the clay is urged thereby, the flow of the fluid, under pressure, into the opposite ends of the cylinders of the motors may be controlled by providing throttling valves 236h in the branches 236d and 236e.

The invention also contemplates another form of manifold and pug-mill organization as seen in Figs. 19 and 20. In this form, the manifold may comprise an elongated tubular section 237 having removable ends 238 whereby it will be capable of conducting clay to the chargers under a comparatively higher pressure without being distorted. To uniformly feed clay into this type of manifold, two pug-mills 239 may be connected therewith at points along the back of same, respectively, midway between the center and ends thereof. By providing the removable ends 238, the displacement hose sections which may also be employed in this form of manifold, may be readily removed therefrom, and whereby the interior thereof may be easily cleaned. As seen in Fig. 21, the pug-mills may be connected with the ends of the manifold.

As to the charge producing capacity of the apparatus, a normal output of from 20 to 25 charges per minute may be expected. Although, the figures given are not absolute for obvious reasons, this rate of output for a single feeder would provide a cycle of about three seconds for a feeding operation.

It is therefore preferred that the filling of the measuring chambers occupy a shorter period of each cycle than that allotted for replenishing the quantity of clay removed from the manifold to the measuring chambers. The reason for allowing more time for manifold filling is that during the time the measuring chambers are being filled the flow of clay into the manifold may be slowed down, stopped or even reversed, depending on whether the auger pressure is greater than, equal to, or less than the manifold pressure. Any slowing down or interruption of the steady flow of clay into the manifold will require more time to deliver an amount of clay equal to that displaced, because of the lost motion.

Various features of the invention and the sequence of operation of cooperating devices thereof may be more clearly understood by reference to the cycle timing chart shown in Fig. 36. For instance, reading in clockwise direction about the center of the chart, the displacement devices are indicated as forcing clay into the measuring chambers during about 90 degrees of the cycle, and the pug mill delivering clay into the manifold during about 264 degrees from a point overlapping about 30 degrees of the 36 degree period the displacement devices are collapsed. During this overlapping period, the gates will be opened within about 15 degrees and the plungers partially lowered thereafter to close the inlets to the measuring chambers at the time the displacement devices are fully collapsed, whereby no excess clay will be fed with the charges.

In Figs. 37 to 40, is illustrated another form of feeder that may be employed in connection with the manifold 29 of the invention. This feeder includes a clay-receiving chamber 242 into which clay is fed from the manifold by way of an inlet 243 of the chamber connected with an outlet 112 of the manifold. In the chamber is a vertically reciprocable plunger 244 which progresses charges of clay through the outlet nozzle 245 in the bottom end of the chamber, segregating said charges simultaneously.

To prevent the extrusion of clay through the nozzle 245 when the plunger 244 is in raised position and to provide a chamber of definite area, a gate or cover plate 246 is slidably associated with the bottom end of the nozzle. The cover plates of the feeders are mounted between parallel side members 247 of an elongated frame 248 which is intermittently reciprocated to cause the plates to open and close the nozzles. The frame may be operated by a fluid pressure motor 249 which may be energized from a main fluid pressure line by way of a cam actuated four-way valve and conduit systems, such as, employed for the motors 235, whereby the cover plates will close the nozzles when the plungers are raised and clay is being fed to the chambers 242.

Each plunger 244, Fig. 40, comprises a permeable head 250 secured to a chamber holder 251 screwed onto the hollow plunger stem 252. A flexible tube 253 conveys fluid under pressure to the head 250, there being a valve 254 in the tube for admitting fluid to the plunger head when the head is in extreme depressed position. The purpose is to repel the charge of clay from the plunger head and insure adhesion of the clay to the mold. If desired, steam or other treating fluids may also be applied to the charge of clay through the permeable head, there being a screen or filter media 255 to filter the fluid and prevent clogging of the pores in said head.

The plunger 244 is reciprocated by means of a piston 257 thereon operating in a cylinder 258. Fluid inlets 259 and 260 of the cylinder are connected to a source of compressed air supply through a cam actuated four-way valve 262 synchronized with the machine to alternately apply pressure above and below the piston.

To limit and adjust to a predetermined extent the lowermost and uppermost point of travel of the plunger head 250, thereby controlling the thickness of the central portion of the bat of clay pressed out in the hollow ware mold 10, regulating means are provided including a fixed scale 263 and cooperating indexed dials 264 and 265 in the form of hand wheels (see Fig. 37), threaded on a stem extension 266 of the plunger 244. The scale 263 determines unit values, such as, for instance the ounces of clay or volume of charge to be delivered and the indexed dials indicate fractions of said units, adjustment of cavity capacity and/or plunger projection extent.

What I claim is:

1. The method of feeding clay to molds in the manufacture of pottery ware which comprises, forcing clay under sustained pressure from a source of supply into and completely filling a chamber, causing the clay to periodically rapidly gush from an outlet of the chamber into a measuring chamber and completely fill the same while opposing reverse movement of the clay into said source, and then discharging the contents of the measuring chamber onto the molding surface of a mold while substantially maintaining the clay in the outlet substantially static.

2. The method of feeding clay to molds in the manufacture of jiggered pottery ware which comprises, forcing clay under sustained pressure from a source of supply into a chamber, periodically applying additional pressure to the clay in the chamber to cause clay to gush therefrom into several measuring chambers substantially simultaneously, and relaxing the added pressure whilst additional clay is being forced into the first chamber to replace the clay previously removed therefrom and whilst the contents of the measuring chambers are being discharged onto the molding surface of various jigger molds.

3. The method of forming mold charges in the manufacture of pottery ware which comprises, forcing clay under pressure from a source of supply into a chamber, causing the clay to rapidly gush from the chamber into a measuring chamber having a discharge outlet whilst the outlet is closed to thereby completely fill the measuring chamber and solidly pack the clay thereinto and thereafter opening the outlet and discharging the contents of the measuring chamber therethrough onto the molding surface of a mold.

4. The method of feeding clay to molds in the manufacture of jiggered pottery ware which comprises, forcing clay under controlled pressure from a source of supply into a chamber and by the application of controlled auxiliary pressure thereto, causing the clay to gush from several outlets into several measuring chambers simultaneously and with sufficient speed and force to periodically fill all the measuring chambers and solidly pack therein within the minor portion of each cycle of operation relaxing the auxiliary pressure and discharging the contents of the several measuring chambers to several molds whilst maintaining the clay in the outlets substantially static.

5. The method of charging plaster jiggering molds with clay which comprises, preparing a charge of clay of predetermined bulk and shape and depositing the charge on a selected portion of the ware forming surface of a mold, pressing a portion of the charge against the molding surface to attach the charge thereto in predetermined position to preclude dislocation of the charge while in transit with the mold between feeding and forming stations, moving the mold to the forming station and there repressing the charge to spread the same over the entire ware forming surface of the mold.

6. In combination, a manifold having discharge outlets leading to measuring chambers, means for forcing clay into the manifold from a source of supply and means operable to periodically increase and decrease the clay containing capacity of the manifold for causing the clay to rapidly gush from the manifold into the measuring chamber or chambers.

7. The method of producing an intermittent discharge of clay through the outlet of a manifold which comprises periodically inflating and deflating an expansion member disposed in the manifold.

8. In combination with apparatus for advancing a line of pottery molds along a path wherein clay is formed on the molds into articles of pottery, a plurality of clay discharge nozzles through which clay may be fed located above the path of travel of the molds and adapted to feed clay charges of a shape or volume predetermined for the particular nozzle to successive molds moving in the path, clay passages for the several nozzles continuing from inlets, clay extrusion means for supplying clay under pressure to the inlets and fluid pressure actuated means for effecting a quick increase in pressure to rapidly discharge clay simultaneously through the various inlets and thereby rapidly replace the amount of clay previously moved through the passages and discharged through the nozzles.

9. In combination with apparatus for advancing a line of pottery molds along a path wherein clay is formed on the molds into articles of pottery, a plurality of clay discharge nozzles through which clay may be fed located above the path of travel of the molds and adapted to feed clay charges of a size or weight predetermined for the particular nozzle to successive molds moving in the path, measuring chambers for the several nozzles each having a clay inlet, means for supplying clay under pressure to the inlets and fluid pressure actuated means operable to effect a quick increase in pressure to rapidly discharge clay simultaneously through the various inlets into the measuring chambers and thereby rapidly replace the quantity of clay previously removed from the chambers and discharged through the nozzles.

10. In combination with apparatus for advancing a line of pottery molds along a path wherein clay is formed on the molds into articles of pottery, a plurality of measuring chambers having discharge outlets through which clay may be fed located adjacent the path of travel of the molds and adapted to feed clay charges of a size or weight predetermined for the particular outlet to successive molds moving in the path, means for periodically filling said chambers with clay, means operable to close said outlets whilst the chambers are being filled with clay and open said outlets thereafter and means operative to discharge the clay from the measuring chambers onto the molding surface of the molds.

11. In an apparatus for charging pottery molds with clay, the combination with a manifold, of a passage for conducting clay from the manifold to molds therebelow, said passage having a measuring chamber therein for shaping and measuring charges, formed with a movable wall at its discharge end so that said end may be opened to permit passage of the charge therethrough and closed whilst the chamber is being filled, and means for discharging the charge from the chamber.

12. In combination with a pottery forming machine having a conveyor for conveying molds, a feeder for supplying clay charges to the molds comprising means forming a charge measuring chamber having an inlet and an outlet, a movable closure for said outlet, a reciprocable plunger for ejecting charges of clay from said chamber, and means for operating said plunger and closure so that the outlet is opened before the charge is ejected and the plunger is withdrawn before the outlet is closed.

13. The combination with a conveyor for conveying pottery molds, of apparatus for supplying clay to the molds thereof comprising a manifold, means forming a measuring chamber communicating with the manifold and having an outlet, clay displacement means for intermittently forcing clay from the manifold into the measuring chamber, a movable closure for the outlet, a reciprocable plunger for ejecting clay charges from said chamber, and means for operating said plunger, closure and displacement means whereby the chamber will be filled with clay and pressure relaxed thereon before the closure is withdrawn and the charge is ejected to the mold.

14. In combination, a clay conducting manifold having an inlet and several outlets, and means within said manifold operable to alternately decrease and increase the available clay containing capacity of the manifold to respectively force clay through the outlets and permit additional clay to be introduced into the manifold.

15. Means for supplying clay to the clay charge feeders of a pottery making machine, including a manifold through which the clay is conducted to the feeders, a source of pressure and means for applying the pressure to the clay in the manifold operable to cause the clay to gush from the manifold into the feeders comprising one or more periodically operated rams.

16. Means for supplying clay to the mold charging feeders of a pottery machine including a manifold through which the clay is conducted to the feeders, and one or more pulsating displacement devices disposed in the manifold for displacing clay through the outlets thereof.

17. In combination, a feeder having a charge measuring chamber with an inlet and an outlet, a movable support for supporting molds in registry with the outlet, a movable closure associated with the outlet, a manifold associated with the inlet having a pulsator associated therewith to force clay into the measuring chamber, a movable plunger for ejecting charges from said chamber and means for co-ordinating the movements of the closure, plunger, support and pulsator so that molds are moved to the feeder outlet the measuring chamber filled, the outlet opened, the charge ejected, the plunger lifted and the outlet closed in the sequence named.

18. The combination with an intermittently operating clay charge feeder having a measuring chamber, of a manifold for conducting the clay thereto provided with a periodically operated pulsator therein arranged to periodically force the clay into the chamber to fill same and means for relieving pressure in the manifold operable in response to abnormal pressure on the clay therein.

19. The combination with apparatus for transporting pottery molds to a feeding position of a clay extrusion machine, a manifold into which clay is discharged from the extrusion machine having a plurality of outlets, mold charging means associated with said outlets for feeding charges of clay to molds therebelow having measuring chambers, means for varying the capacity of said chambers, and fluid pressure operated means for discharging clay from the manifold into the charge measuring chambers and from the measuring chambers onto the molding surface of the molds including an expansion device associated with the manifold and a reciprocable ejector associated with each mold charging means.

20. The combination with apparatus for transporting pottery molds to a clay feeding position of a source of clay under pressure, a pressure manifold having several outlets and an inlet connected to the source of clay, means operable to intermittently increase and decrease the pressure within the manifold to thereby discharge clay through the outlets, and clay feeders having measuring chambers associated with the outlets to receive clay discharged through the outlets.

21. The combination with apparatus for transporting pottery molds to a clay feeding position of a pressure manifold having an inlet and several outlets, means for delivering clay under pressure through the inlet into the manifold, means for periodically increasing the pressure in the manifold to thereby cause a discharge of clay through the outlets and decreasing the pressure to permit clay to flow into the manifold between discharges and clay feeders associated with each outlet having measuring chambers for receiving clay from the outlets and means for discharging clay from the measuring chamber onto the ware-forming surface of molds therebelow.

22. The method of feeding clay to molds in the manufacture of pottery dinnerware and the like which comprises, forcing clay under pressure from a source of supply into a confined space, squeezing the clay in the confined space to cause the extrusion of clay through several outlets leading therefrom to charge segregating positions whilst maintaining input pressure on the clay being delivered to the confined space, and thereafter relaxing the squeezing pressure to allow additional clay to flow into the confined space to replace the clay previously displaced.

23. The combination with a plurality of feed passages for conducting clay to pottery dinnerware molds of apparatus for supplying clay to said passages comprising a variable capacity manifold having a plurality of outlets each connected to a passage, a source of clay connected to said manifold operable to continuously supply clay to said manifold, and means operable to intermittently effect a variation in the capacity of the manifold to alternately discharge clay through the various outlets and permit clay to flow into the manifold from the source respectively.

24. The combination with a plurality of clay feed passages for conducting clay to pottery dinnerware mold charging positions of apparatus for supplying said passages with clay comprising a manifold having a plurality of outlets each connected to a clay passage, a source of clay supply connected to said manifold operable to continuously deliver clay thereto under pressure, closures for said passages, means for varying the pressure on the clay in the manifold for alternately extruding clay through said outlets and permitting clay to enter the manifold from the source.

25. In combination, a manifold for receiving a quantity of clay to be extruded through the outlets thereof and segregated into pottery mold charges and a member inside the manifold connected to a pulsating source of fluid pressure for transmitting the pulsations to the clay to effect the extrusion of clay aforesaid.

26. The combination with a plurality of chambers of variable capacity for receiving clay to be formed into charges and applied to molds, each chamber having an inlet and an outlet of a manifold common to all of said chambers whose outlets are connected to the inlets of said chambers for supplying clay to said chambers, a source of pressure and means for applying the pressure to the clay in the manifold to cause the clay to flow and fill said chambers and means for regulating the size of the inlet leading to each chamber.

27. The combination with a plurality of chambers for receiving clay to be formed into charges and deposited on molds therebelow of a manifold common to all of said chambers, a source of clay supply, an auger for moving clay from the source into said manifold and means for periodically imparting axial movement to the auger to cause the clay in the manifold to flow therefrom into said chambers.

28. The combination with a plurality of clay passages leading to a pottery dinnerware mold charging position of apparatus for supplying clay to said passages comprising a manifold having several outlets each connected to a clay passage, a source of clay connected to said manifold operable to continuously supply clay under pressure thereto and means for varying the pressure on the clay in the manifold for alternately extruding clay through the outlets and permitting clay to enter the manifold from the source.

29. Apparatus for producing an intermittent discharge of clay through the outlet of a container, in supplying clay from which pottery dinnerware mold charges are made which comprises, an expandible member disposed in said container and means for periodically expanding said member to force clay through the outlet and contracting the member to allow clay to enter the container.

30. In combination, a manifold for receiving a quantity of clay to be extruded through the outlets thereof and segregated into pottery mold charges, a bladder inside the manifold, a source of pressure, and means for periodically establishing communication between the source of pressure and the bladder to inflate said bladder and cause clay to extrude through the manifold outlets.

31. The combination with a manifold for receiving a quantity of clay to be extruded through the outlets thereof and segregated into pottery mold charges of a source of clay, a source of pressure for forcing clay from said source into said manifold, and another source of pressure to be applied periodically under regulated control to the clay in said manifold to effect the discharge thereof through said outlets.

32. The combination with mold transporting means for indexing molds from station to station, of apparatus for supplying clay to molds at one of said stations including a continuously driven pug mill having a discharge orifice, a clay container having an inlet connected to said discharge orifice and an outlet leading to a mold charging position, fluid pressure operated means external to the body of clay in the container for moving the clay in said container through said outlet independently of said pug mill and means for segregating charges of clay from the material issuing from said outlet.

33. In combination, a pug mill and a container connected thereto for receiving plastic ceramic material therefrom and means for moving clay out of said container comprising fluid pressure operated means external to the body of clay but operable internally of the container.

WILLIAM J. MILLER.